(12) United States Patent
Zhao et al.

(10) Patent No.: US 12,250,058 B2
(45) Date of Patent: Mar. 11, 2025

(54) METHOD AND APPARATUS FOR UAV AND UAV CONTROLLER PAIRING AND COMMAND AND CONTROL (C2) QUALITY OF SERVICE PROVISIONING

(71) Applicant: Tencent America LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 298 days.

(21) Appl. No.: 17/746,720

(22) Filed: May 17, 2022

(65) Prior Publication Data

US 2022/0376772 A1    Nov. 24, 2022

Related U.S. Application Data

(60) Provisional application No. 63/190,682, filed on May 19, 2021.

(51) Int. Cl.
*H04B 7/185* (2006.01)
*H04W 24/02* (2009.01)
(Continued)

(52) U.S. Cl.
CPC ........ *H04B 7/18506* (2013.01); *H04W 24/02* (2013.01); *H04W 24/08* (2013.01); *H04W 76/11* (2018.02); *H04W 76/14* (2018.02)

(58) Field of Classification Search
None
See application file for complete search history.

(56) References Cited

U.S. PATENT DOCUMENTS

2009/0043681 A1* 2/2009 Shoji ................. G06F 21/43
 726/17
2009/0204974 A1* 8/2009 Feehrer .............. G06K 7/10039
 719/314

(Continued)

FOREIGN PATENT DOCUMENTS

| WO | 2020101388 A1 | 5/2020 |
| WO | 2020163760 A2 | 8/2020 |
| WO | 2021041214 A1 | 3/2021 |

OTHER PUBLICATIONS

Japanese Office Action issued Aug. 29, 2023 in Application No. 2022-567372, 5 pages.

(Continued)

*Primary Examiner* — Clemence S Han
(74) *Attorney, Agent, or Firm* — ArentFox Schiff LLP (57) ABSTRACT

In a method of group creation for a pair of an unmanned aerial vehicle (UAV) and an unmanned aerial vehicle-controller (UAV-C) in a service enabler architecture layer (SEAL) architecture, the pair of UAV and UAV-C is determined by an unmanned aerial system application enabler (UAE) server in the SEAL architecture. A group creation request for the pair of UAV and UAV-C is transmitted by the UAE server to a SEAL group management (GM) server of the SEAL architecture. A first response message is received by the UAE server from the SEAL GM server for the group creation request. A group including the pair of the UAV and the UAV-C is created for quality-of-service (QoS) management. The group creation request includes an identity of an UAE client corresponding to the pair of UAV and UAV-C, an identity of the UAV, and an identity of the UAV-C.

18 Claims, 6 Drawing Sheets

(51) Int. Cl.
*H04W 24/08* (2009.01)
*H04W 76/11* (2018.01)
*H04W 76/14* (2018.01)

(56) References Cited

U.S. PATENT DOCUMENTS

| | | | | |
|---|---|---|---|---|
| 2020/0178052 | A1* | 6/2020 | Pattan | H04L 41/5058 |
| 2021/0352558 | A1* | 11/2021 | Pu | H04W 76/30 |
| 2022/0086741 | A1* | 3/2022 | Liao | B64C 39/024 |
| 2022/0141662 | A1* | 5/2022 | Liao | H04W 12/37 |
| | | | | 726/1 |
| 2022/0279355 | A1* | 9/2022 | Roy | H04W 12/50 |
| 2023/0276509 | A1* | 8/2023 | Karampatsis | H04W 12/06 |
| | | | | 370/329 |
| 2023/0284078 | A1* | 9/2023 | Pateromichelakis | |
| | | | | H04W 56/0015 |
| | | | | 370/235 |
| 2024/0098494 | A1* | 3/2024 | Baskaran | G08G 5/0013 |

OTHER PUBLICATIONS

"5G; Service Enabler Architecture Layer for Verticals (SEAL); Functional architecture and information flows (3GPP TS 23.434 version 16.6.0 Release 16)", ETSI Technical Specification, European Telecommunications Standards Institute (ETSI), 650, Route Des Lucioles; F-06921 Sophia-Antipolis; France vol. 3GPP SA, No. VI6.6.0, Jan. 14, 2021, pp. 1-125.

Supplementary European Search Report issued Aug. 4, 2023 in Application No. 22792734.0, 9 pages.

Office Action received for Chinese Patent Application No. 202280004817.9, mailed on Jan. 10, 2025 with translation, 14 pages.

Shuai Zhao, "Procedure for UAV and UAV-C Pairing and C2 QoS Provisioning using Group ID", 3GPP TSG-SA WG6 Meeting #42-BIS-e S6-210749, Apr. 12-20, 2021, 3 pages.

* cited by examiner

METHOD AND APPARATUS FOR UAV AND UAV CONTROLLER PAIRING AND COMMAND AND CONTROL (C2) QUALITY OF SERVICE PROVISIONING

INCORPORATION BY REFERENCE

This present disclosure claims the benefit of priority to U.S. Provisional Application No. 63/190,682, "Unmanned Aerial System Communication" filed on May 19, 2021, which is incorporated by reference herein in its entirety.

TECHNICAL FIELD

The present disclosure relates to unmanned aerial system communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An unmanned aerial vehicle (UAV), or uncrewed aerial vehicle, can include an aircraft without any human pilot, crew, or passengers on board. UAVs are a component of an unmanned aircraft system (UAS). The UAS can further include a ground-based controller and a system of communications with the UAV. A communication system to support the connectivity needs of unmanned aircraft systems is under development.

SUMMARY

Aspects of the disclosure provide methods and apparatuses for pairing a UAV and a UAV-C based on a group ID and conducting C2 QoS provisioning under a 3GPP network by using the group ID. In some examples, an apparatus for pairing the UAV and the UAV-C includes receiving circuitry and processing circuitry.

A method of group creation can be provided for a pair of an unmanned aerial vehicle (UAV) and an unmanned aerial vehicle-controller (UAV-C) in a service enabler architecture layer (SEAL) architecture. In the method, the pair of UAV and UAV-C can be determined by an unmanned aerial system application enabler (UAE) server in the SEAL architecture. A group creation request for the pair of UAV and UAV-C can be transmitted by the UAE server to a SEAL group management (GM) server of the SEAL architecture. A first response message can be received by the UAE server from the SEAL GM server in response to the group creation request. A group including the pair of UAV and the UAV-C can be created based on the first response message. The group is used for quality-of-service (QoS) management. The group creation request can include an identity of an UAE client that corresponds the pair of UAV and UAV-C, an identity of the UAV, and an identity of the UAV-C.

In some embodiments, the group creation request can further include a civil aviation authority (CAA)-level identity of the UAV.

In some embodiments, the group creation request can further include a timeout period that defines a waiting time limit to wait for the first response message from the SEAL GM server after the group creation request is transmitted to the SEAL GM server.

In the method, another group creation request can be transmitted when the first response message is not assigned to the UAV server within the timeout period.

In some embodiments, the first response message can further include a group creation result that indicates whether the group is successfully created for the pair of the UAV and the UAV-C.

In an embodiment, in response to the group creation result indicating that the group is successfully created for the pair of the UAV and the UAV-C, the first response message can include a group identity (ID) that is assigned to the pair of UAV and UAV-C.

In another embodiment, in response to the group creation result indicating that the group is successfully created for the pair of UAV and UAV-C, the first response message can include a plurality of subgroup IDs associated with the pair of UAV and UAV-C.

In the method, the QoS management can be performed by the UAE server for the pair of UAV and UAV-C based on the assigned group ID.

To perform the QoS management, direct command and control (C2) communication can be established for the pair of UAV and UAV-C using an initially allocated network QoS setup, where the UAV and the UAV-C can be registered to a network. A current network condition of the pair of UAV and UAV-C can be monitored by the UAE server based on feedback information from the pair of UAV and UAV-C. In response to the direct C2 communication failing to meet a pre-defined QoS requirement, a QoS adaption request can be transmitted by the UAE server to a SEAL network resource management (NRM) server. An updated QoS requirement can be received by the UAE server from the SEAL NRM server. The feedback information of the pair of UAV and UAV-C can include the group ID assigned to the pair of UAV and UAV-C and a network resource requirement that indicates required C2 communication resources.

In some embodiments, the current network condition of the pair of UAV and UAV-C can be monitored by the UAE server based on the one of the group ID and a subgroup ID assigned to the pair of UAV and UAV-C.

In the method, the C2 communication for the pair of UAV and UAV-C can be adjusted based on the updated QoS requirement.

In some embodiments, in response to receiving the feedback information of the pair of UAV and UAV-C for the current network condition, a second response message can be provided by the UAE server to the pair of UAV and UAV-C, where the second response message can include a QoS result that indicates whether the direct C2 communication of the pair of UAV and UAV-C meet the pre-defined QoS requirement.

According to another aspect of the disclosure, an apparatus is provided. The apparatus has processing circuitry. The processing circuitry can be configured to perform any of the methods mentioned above.

Aspects of the disclosure also provide a non-transitory computer-readable medium storing instructions which when executed by a computer cause the computer to perform any of the methods mentioned above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
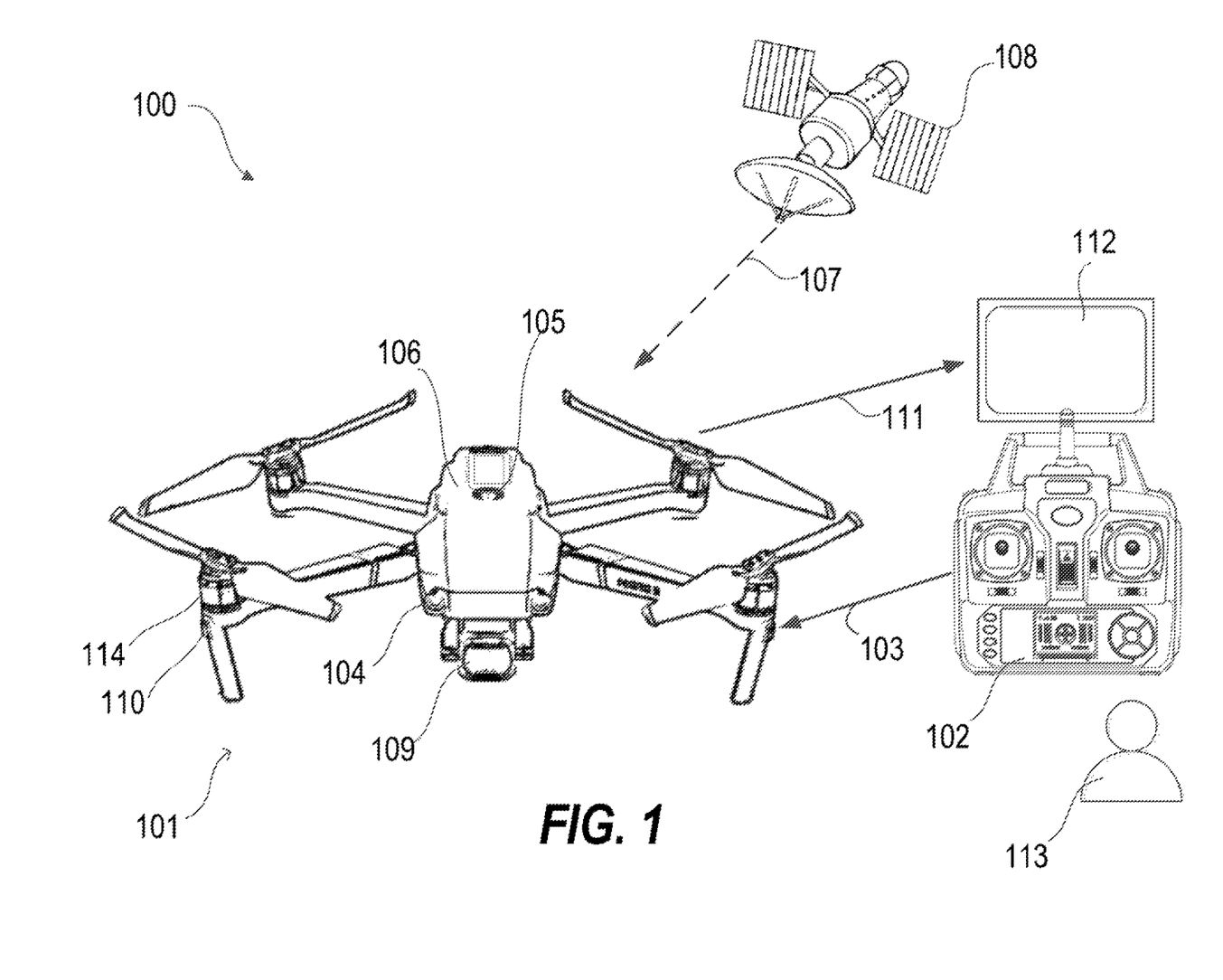
FIG. 1 is a schematic illustration of an Unmanned Aerial System (100) in accordance with an embodiment.

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication, through the data link (103), via very high frequency (VHF) and/or ultra-high frequency (UHF), and/or other wireless technology capable of analog and/or digital radio communications. The controller (102) may control power levels of the propulsion unit (114), such as one or more motors and/or engines, of the UAV (101) and/or the control surfaces of a model aircraft (not depicted). More abstract commands like pitch, yaw, and roll, similar to those of helicopters and/or aircrafts can also be used. An experienced pilot can operate the UAV (101) with basic controls, not relying on advanced onboard processing of control signals inside the UAV (101). The UAV (101) can be in a form of a helicopter and/or any other aircraft.

Advances in onboard electronic designs allow the off-loading of certain tasks from the human operator (or user) 113 to the UAV (101) itself. Many UAVs, such as the UAV (101), can include sensor(s) (104) that are coupled to an onboard control circuitry (105) for sensing the attitude as well as the acceleration of the UAV (101). The onboard control circuitry (105) can be a computer system with a scaled-down and/or non-existent user interface. The information obtained by the sensor(s) (104), in addition to the control inputs received from the data link (103) from the controller (102), allows the UAV (10) to remain stable unless a positive control input is obtained from the controller (102).

The UAV (101) can include a receiver (106) for one of the Global Navigation Satellite Systems (GNSS), such as the Global Positioning System (GPS) operated by the United States. FIG. 1 illustrates a single satellite (108) that can provide a communication signal (107), to represent a GNSS. However, the receiver (106) of the UAV (101) may receive communication from a GNSS that includes three or more, and typically four or more, line-of-sight satellites to triangulate the position of the UAV (101) in space. A GNSS receiver, such as the receiver (106), can determine with fair accuracy the position of the UAV (101) in space and time. In the UAV (101), the GNSS can be augmented by additional sensors (e.g., an ultrasonic and/or lidar sensor) of the UAV (101) on the, in many cases, most critical vertical (e.g., Z) axis to enable soft landings (not depicted). The UAV (101) including GNSS capability can offer the user "fly home" and "auto-land" features. Thus, the UAV (101), upon a simple command from the controller (102) (e.g., the push of a single button), or in case of a lost data link (103) from the controller or other timeout of meaningful control input, can fly to a location that was defined as a home location.

The UAV (101) can also include one or more cameras (109). In some cases, the UAV (101) can include a gimbal-mounted camera as one of the cameras (109). The gimbal-mounted camera can be used to record pictures and/or a video of a quality sufficient for the user (113) of the UAV (101), such as in high definition television resolution. The UAV (101) can include other cameras (110) for covering some or all axis of movement. Onboard signal processing based on signals of the other cameras (110) can be used to prevent the UAV (101) from colliding with both fixed and moving objects.

In some cases, the UAV (101) can include a "main" camera as one of the cameras (109). The signal of the "main" camera can be communicated via the data link (111) in real-time towards the human user (e.g., the user (113)), and displayed on a display device (112) included in, attached to, and/or separate from the controller (102). The data link (111) may be the same or different from the data link (103). Accordingly, the UAV (101) may be successfully flown out of line of sight of a human pilot, using a technique known as "First Person View" (FPV).

As a result of the technical developments, UAVs, such as the UAV (101), have become considerably easier to fly, which in turn has made them popular not only with professional UAV pilots and determined and affluent hobbyists, but also the general public. As a result, millions of UAV are now sold every year compared to a few thousand-if that many-model helicopters that were sold about 15 years ago. At the same time, the knowledge, proficiency, and engagement of the user community, on average, has decreased.

A service enabler architecture layer (SEAL) can support vertical applications (e.g., a UAV and vehicle to everything (V2X)). The SEAL functional entities on a user equipment (UE) and a server can be grouped into SEAL client(s) and SEAL server(s) respectively. The SEAL can include a common set of services (e.g., group management, location management) and reference points. The SEAL can offer its services to a vertical application layer (VAL). The VAL can include a VAL client (e.g., UAV) and a VAL server.

Figure 2:
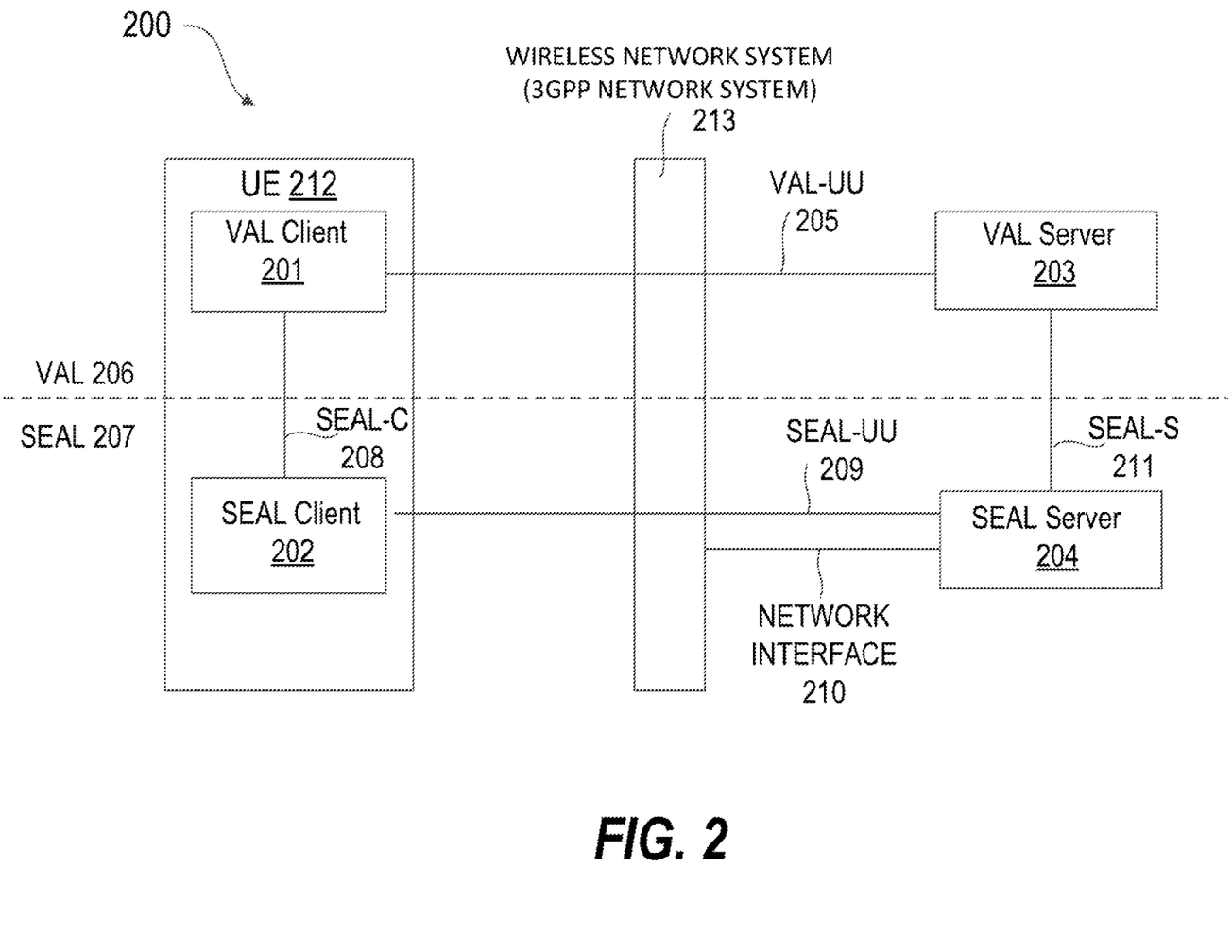
FIG. 2 is an on-network function model (200) for a service enabler architecture layer (SEAL) in accordance with an embodiment.

FIG. 2 shows an exemplary on-network functional model (200) for a service enabler architecture layer (SEAL). The model (200) can be used for network resource management and include a vertical application layer (VAL) (206) and the SEAL (207) over 3GPP wireless networks, such as a 3GPP network system (213), to support vertical applications (e.g., UAV and vehicle to everything (V2X) applications). The model (200) is illustrated as a functional architecture to include common application plane and signaling plane entities. A set of common services (e.g., group management, configuration management, location management) of the model (200) can be shared across vertical applications.

As shown in FIG. 2, the VAL (206) can include a VAL client (201), and a VAL server (203). The SEAL (207) can include a SEAL client (202) and a SEAL server (204). The VAL client (201) and the SEAL client (202) can be communicated to each other to form a User Equipment (212). The SEAL functional architecture shown in FIG. 2 can take into consideration common capabilities to support mission critical and other vertical applications.

Referring to FIG. 2, the VAL client (201) can communicate with the VAL server (203) over VAL-UU (205) reference point. VAL-UU (205) can support both unicast and multicast delivery modes.

The SEAL functional entities on the User Equipment (212) and the server can be grouped into SEAL client(s)

(202) and SEAL server(s) (204), respectively. The SEAL (207) can include a common set of services (e.g., group management, location management) and reference points. The SEAL (207) can provide services to the VAL (206).

The SEAL client(s) (202) can communicate with the SEAL server(s) (204) over the SEAL-UU (209) reference points. The SEAL-UU (209) can support both unicast and multicast delivery modes. The SEAL client(s) (202) can provide the service enabler layer support functions to the VAL client(s) (201) over SEAL-C reference points (208). The VAL server(s) (203) can communicate with the SEAL server(s) (204) over the SEAL-S (211) reference points. The SEAL server(s) (204) may communicate with the underlying 3GPP network systems, such as the 3GPP network system (213), using the respective 3GPP interfaces (e.g., 210) specified by the 3GPP network system.

The specific SEAL client(s) (202) and the SEAL server(s) (204) along with their specific SEAL-UU (209) reference points and the specific network interfaces (210) of 3GPP network system (213) can be provided in the respective on-network functional model for each SEAL service.

The VAL client (201) can provide the client-side functionalities corresponding to the vertical applications (e.g., UAV, V2X client). The VAL client (201) can support interactions with the SEAL client(s) (202).

The VAL server (203) can provide the server-side functionalities corresponding to the vertical applications (e.g., UAV, V2X application servers).

The SEAL client (202) can provide the client-side functionalities corresponding to the specific SEAL service, such as a location management, a group management, a configuration management, an identity management, a key management, and a network resource management. The SEAL client(s) can support interactions with the VAL client(s) (201). The SEAL client also can support interactions with the corresponding SEAL client between the two UEs. For example, a first SEAL client (e.g., SEAL client (202)) of a first UE (e.g., UE (212)) can interact with a second SEAL client (not shown) of a second UE (not shown).

The SEAL server (204) can provide the server-side functionalities corresponding to the specific SEAL service, such as the location management, the group management, the configuration management, the identity management, the key management, and the network resource management. The SEAL server (204) can support interactions with the VAL server(s) (203).

In an exemplary 3GPP 5G wireless architecture, the SEAL (e.g., SEAL (207)) can provide procedures, information flows and Application Program Interfaces (APIs) to support vertical applications over the 3GPP system (e.g., 213) to ensure efficient use and deployment of vertical applications over 3GPP systems.

Figure 3:
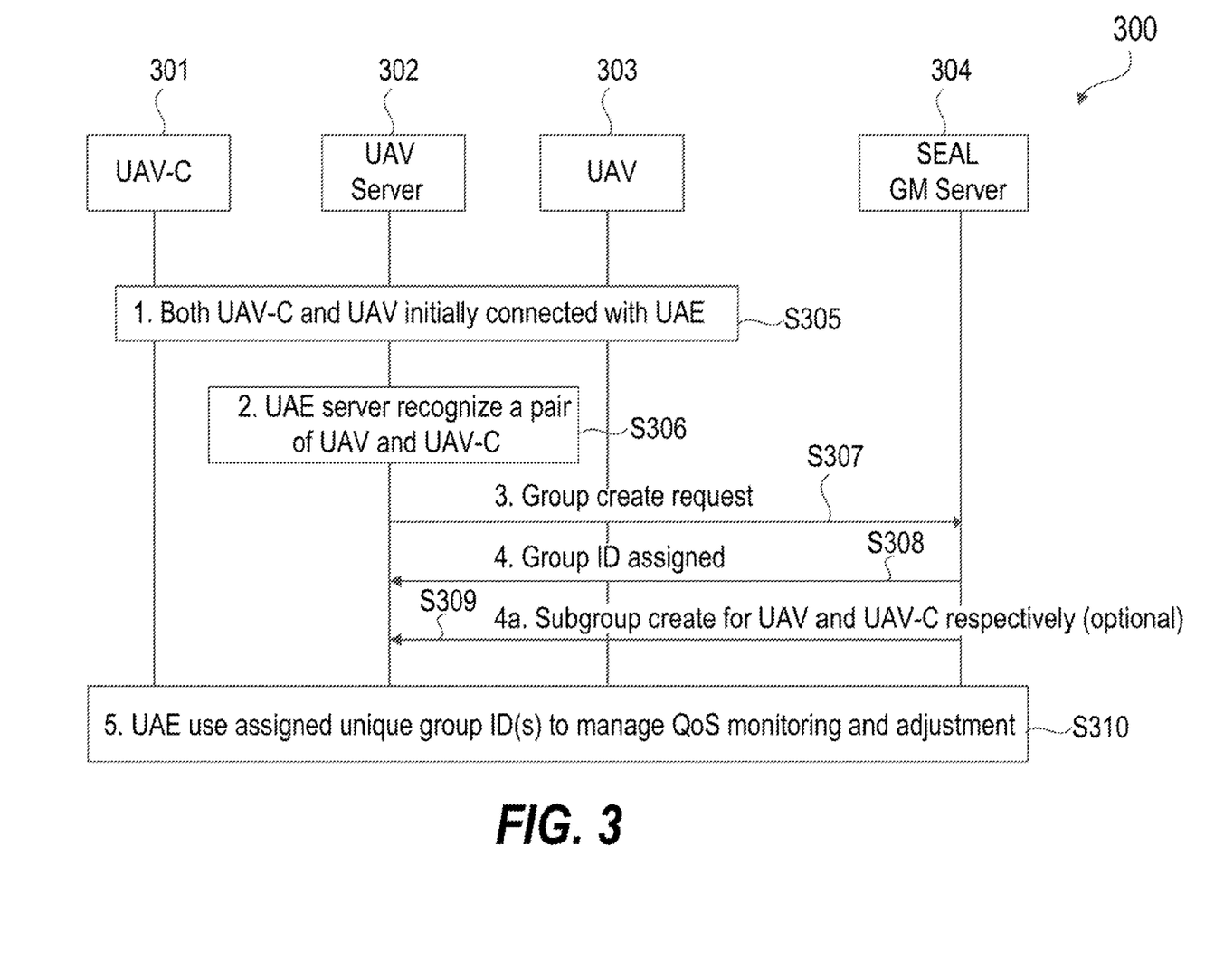
FIG. 3 shows a group creation process (300) in accordance with an embodiment.

The SEAL group manager (GM) (e.g., SEAL GM server (304)) can enable group management operations for an upper application layer.

Figure 4:
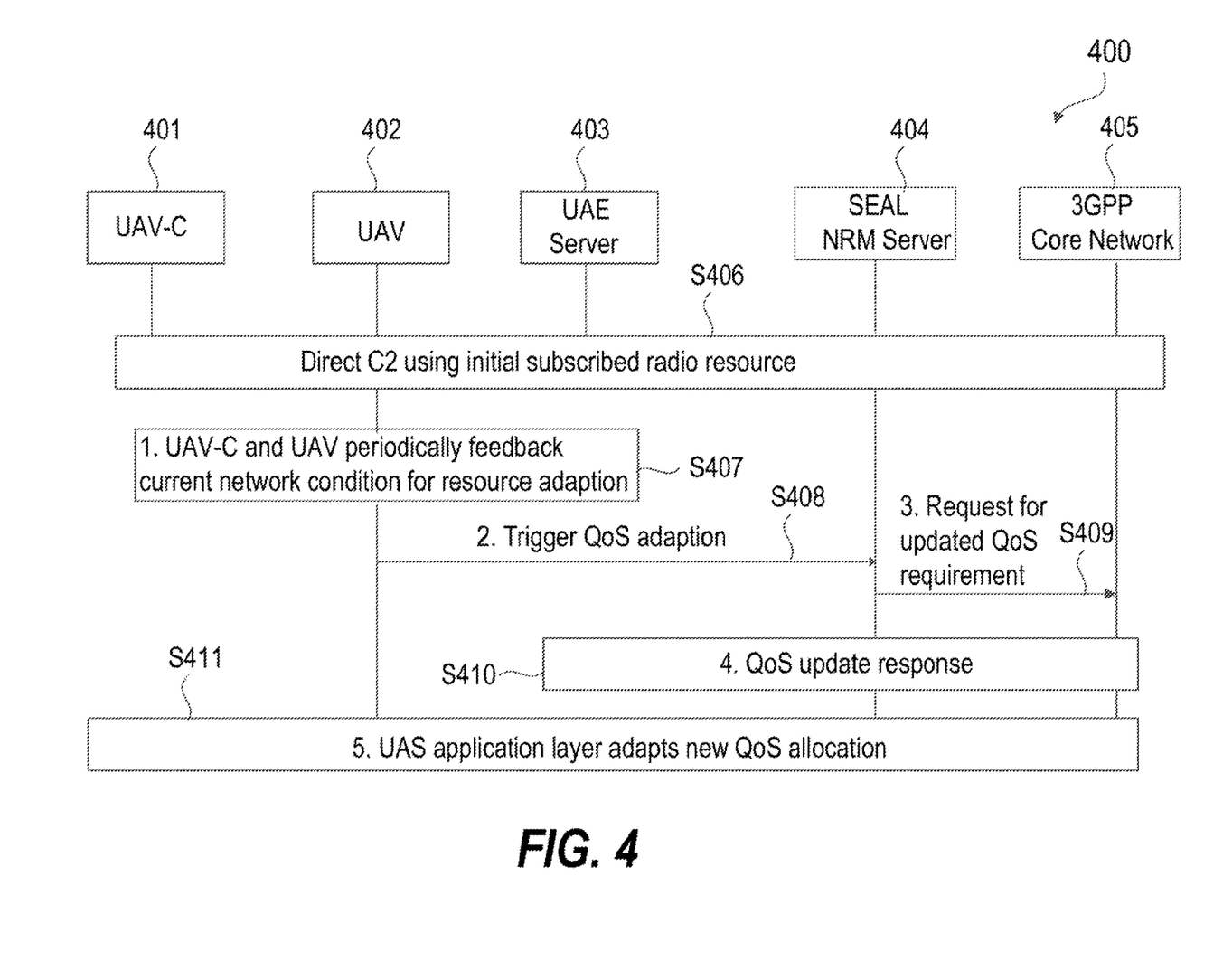
FIG. 4 shows a process (400) of group-based direct command and control (C2) quality of service (QoS) provisioning in accordance with an embodiment.

The SEAL network resource manager (NRM) server (e.g., SEAL NRM server (404)) can enable support for unicast and multicast network resource management for an upper application layer.

Three C2 (command and control) communication modes can be supported in 5G wireless technology: Direct C2, Network-Assisted C2, and UAS Traffic Management (UTM)-Navigated C2 communication.

Direct C2 can establish a direct C2 link between a UAV controller (e.g., UAV-C (301)) and a UAV (e.g., UAV (303)) to communicate with each other. Both the UAV controller and the UAV can be registered to on a wireless network, such as a 5G network (e.g., wireless network system 213) using the radio resource configured and scheduled by the wireless network for direct C2 communication.

In Network-Assisted C2 communication, the UAV controller and UAV can register and establish a respective unicast C2 communication link to the wireless network, such as the 5G network, and communicate with each other via the network.

In UTM-Navigated C2 communication, the UAV can be provided a pre-scheduled flight plan, and UTM can maintain a C2 communication link with the UAV in order to regularly monitor the flight status of the UAV, verify the flight status with up-to-date dynamic restrictions, provide route updates, and navigate the UAV whenever necessary.

In the disclosure, an information flow and data points can be provided to enable UAV and UAV-C pairing as well as C2 provisioning using a group identifier of the UAV and UAV-C. The C2 provisioning can include C2 quality of service (QoS) provisioning under a 3GPP network using SEAL, for example.

Both the UAS originated QoS (e.g., uplink from the UAS to the network) and the UAS terminated QoS (e.g., downlink from the network to UAS) can be maintained for UAS application layer operations. The QoS can include but is not limited to network bandwidth, latency, jitter, data loss rate, and/or the like. The three C2 communication modes mentioned above may require different network resource supports from the UAS application layer.

With regarding to direct C2 communication, a SEAL Group Manager (e.g., SEAL GM server (304)) may need to be configured to ensure a match between a pair of UAV and UAV-C, such as based on a certain UAS ID configuration. Network QoS provisioning can be triggered by the SEAL NRM server (e.g., SEAL NRM server (404)) based on a group ID associated with the pair of UAV and UAV-C. In some cases, respective subgroups may be created for each of the UAV and UAV-C to achieve separate QoS control for each uplink and downlink. Therefore, direct C2 QoS Provisioning using a group-based approach can be provided. A goal of QoS provisioning is to achieve a more deterministic network behavior, so that information carried by the network can be better delivered and network resources can be better utilized.

Referring to FIG. 3, a procedure (300) of group creation for a pair of UAV and UAV-C can be shown. First of all, at step (S305), both a UAV-C (301) and a UAV (303) may have successfully connected to a UAS Application Enabler (UAE) server (302) with a common UAS ID. In some embodiments, a respective civil aviation authority (CAA)-level UAV ID may have been assigned to the UAV-C (301) and/or the UAV (303). Thus, the UAV-C (301) and/or the UAV (303) can be connected to the UAE server (302) based on the respective CAA-level UAV ID. In some embodiments, the UAV-C (301) and the UAV (303) can act as VAL clients, such as the VAL client (201) in FIG. 2.

At step (S306), a UAE server (302) can recognize the pair of UAV (303) and UAV-C (301). For example, The UAE server (302) can recognize the pair of UAV (303) and UAV-C (301) based on a identifier of the pair. For example, the UAE server can recognize the pair of UAV (303) and UAV-C (301) either by a respective 3GPP UE ID and/or a respective CAA-level UAV ID associated with the UAV-C (301) and the UAV (303). In some embodiments, the UAE server (302) can act as a VAL server, such as the VAL server (203) in FIG. 2.

At step (S307), the UAE server (302) can send a group creation request to a SEAL group management (GM) server (304) using a GM-S reference link. For example, the UAE server (302) can send the group creation request to the SEAL GM server (304), if a group ID has not been assigned for the pair of UAV (303) and UAV-C (301), by using the GM-S reference link. A GM-S reference point can support interactions related to group management functions between VAL server(s) and the group management server. For example, the GM-S reference point supports the VAL server (e.g., UAV server (302)) to obtain group information corresponding to the VAL service (e.g., UAV service). The GM-S reference point can use HTTP-1/HTTP-2 reference points for transport and routing of group management related signaling. The GM-S reference point can use SIP-2 reference point for subscription/notification related signaling.

A group creation request can be sent to a group management server. In an example, a group management client of the authorized VAL user/UE/administrator sends a group create operation request to the group management server. The identities of the users or UEs can be combined and the information of the VAL services that are enabled on the group can be included in this message. Table 1 shows exemplary data points from the group management client to the group management server when the group management client sends the group creation request to the group management server.

TABLE 1

Data points for group creation request

| Information element | Status | Description |
| --- | --- | --- |
| Requester Identity | M | The identity of the group management client performing the request. |
| Identity list | M | List of VAL user IDs or VAL UE IDs that are part of the group to be created corresponding to the list of the configured services |
| VAL service ID list (see NOTE 1) | O | List of VAL services whose service communications are to be enabled on the group. |
| VAL service specific information (see NOTE 2) | O | Placeholder for VAL service specific information |

NOTE 1:
This information element shall be included in the message for creating a group configured for multiple VAL services.
NOTE 2:
The details of this information element are specified in VAL service specific specification and are out of scope of the present document.

It should be noted that "M" stands for "Mandatory", and "O" stands for "Optional". The VAL user can be an authorized user, who can use a VAL UE to participate in one or more VAL services. An exemplary VAL user can be the user 113 in FIG. 1. In an embodiment, the VAL UE ID can be a UE ID associated with the UAV (303). The VAL service can be associated with a UAV service or a V2X service.

Group creation can provide a dedicated VAL group (e.g., the pair of UAV (303) and UAV-C (301)), to individual VAL users to enable the required communication for one or multiple VAL services. This can include the normal group creation by administrators or by authorized user/UE. The group management server can support the external group identifier within the VAL group to enable the SEAL servers to consume network exposure functions (NEF) services for the member UEs of the VAL group.

In some embodiments, the SEAL GM server (304) can act as a SEAL server, such as the SEAL server (204) in FIG. 2.

At step (S308), the SEAL GM server (304) may respond to the group creation request and create a group ID for the pair of UAV (303) and UAV-C (301). The SEAL GM server (304) can create one group ID for the pair of UAV (303) and UAV-C (301) as specified in 3GPP TS 23.434. For example, during the group creation, the group management server creates and stores the information of the group. The group management server performs the check on the policies, such as a maximum limit of the total number of VAL group members for the VAL group(s). The external group identifier, identifying the member UEs of the VAL group at the 3GPP core network, can stored in the newly created VAL group's configuration information. Further, the group ID can be returned to the UAE server (302). The group ID for the pair of UAV (303) and UAV-C (301) can act as a VAL group ID. The VAL group ID can be a unique identifier within the VAL service (e.g., UAV) that represents a set of VAL users or VAL UE according to the VAL service. The set of VAL users may belong to the same or different VAL service providers. The VAL group ID can indicate a VAL application server (e.g., the UAE server) where the group is defined.

At step (S309), in some cases, subgroups may also be created by the SEAL GM server (304) for the UAV (303) and the UAV-C (301) respectively.

At (S310), the UAE server (302) may use the returned group ID(s), such as the group ID created for the pair of UAV (303) and UAV-C (301) by the SEAL GM server (304), for QoS management. In response to the subgroups being created for the UAV (303) and the UAV-C (301), the UAE server (302) may use subgroup ID(s) to manage QoS for the UAV (303) and the UAV-C (301) separately. QoS can refer to any technology that manages data traffic to reduce packet loss, latency, and/or jitter on a network. QoS can control and manage network resources by setting priorities for specific types of data on the network.

In order to support the group creation for the UAV (303) and the UAV-C (301), data points can be provided between the UAE client (e.g., the UAV (303) and the UAV-C (301)) and the UAE server (302). Exemplary data points can include the elements illustrated in Table 2.

TABLE 2

Data points for group creation

| Information element | Status | Description |
| --- | --- | --- |
| UAE client ID | M | The identifier of the UAE client |
| UAV UE ID | M (NOTE) | The identifier of UAV UE ID |
| UAV-C UE ID | M (NOTE) | The identifier of UAV-C UE ID |
| CAA-level UAV ID | O | The CAA-Level UAV ID |
| Timeout | O | The timeout period when group creation response is not received. A request may be sent again after timeout. |

NOTE:
Either or both of the IDs should be present

It should be noted that "M" stands for "Mandatory", and "O" stands for "Optional" in Table 2.

In some embodiments, the data points can be provided at step (S307), where the UAE server (302) can send the group creation request to the SEAL GM server (304) using the GM-S reference link. The UAE client in Table 2 can correspond to the UAV (303) and UAV-C (301).

Data points can be provided between the UAE server (302) and the UAE client in Table 3 as a response. The data points in Table 3 can be obtained when the SEAL GM server (304) responds to the group creation request and creates the group ID for the pair of UAV (303) and UAV-C (301) at step (S308).

TABLE 3

Response data points for group creation

| Information element | Status | Description |
|---|---|---|
| Result | M | The identification of successfulness of UAS (one pair of UAV and UAV-C) group creation. When successful, a UAS group ID shall be provided in the result message. |

Once group ID(s) has been assigned by the SEAL server, such as the SEAL GM server (303), the UAE server (302) can perform QoS provisioning based on the group ID(s).

Referring to FIG. 4, a high-level workflow (400) of group-based direct C2 QoS provisioning can be provided.

At step (S406), a UAV-C (401) may use initially allocated network QoS setup for direct C2 communications with a UAV (402). In some embodiments, both the UAV (402) and the UAV-C (401) may have registered to a 3GPP 5G network respectively. For example, both the UAV (402) and the UAV-C (401) can be registered to the 5G network using the radio resource configured and scheduled by the 5G network for direct C2 communication. The direct C2 can establish a direct C2 link between the UAV-C (401) and the UAV (402) to communicate with each other.

At step (S407), a UAE server (403) can periodically monitor the QoS for the UAV (402) and the UAV-C (401) using a group ID or subgroup ID(s) associated with the UAV (402) and the UAV-C (401). The group ID or subgroup ID(s) can be created based on the process (300) mentioned above. The QoS includes but is not limited to network bandwidth, latency, jitter, data loss rate, etc.

At step (S408), in cases where the direction C2 communication does not satisfy a pre-defined QoS requirement, the UAE server (403) may choose to send a QoS adaptation request to a SEAL NRM server (405) using a NRM-S reference point as specified in 3GPP TS 23.434 for example. The QoS adaptation request can be sent per group or sub-group, which depends on how the UAE server (403) handles the group creation, such as the group creation shown in FIG. 3.

At step (S409), the SEAL NRM server (404) can perform network resource adaptation, for example as specified in 3GPP TS 23.434. In an example, the VAL server (e.g., UAE server (403)) sends a network resource adaptation request to the NRM server (e.g., NRM server (404)) for one or more users belonging to one or more VAL services (e.g., UAS service, V2X server), and may comprise one or more VAL UEs (e.g., UAV-C (401) and UAV (402)) that will have updated resource requirement. This requirement may be in the form of exact resources/resource pools to be used or indication of bandwidth increase/decrease for the corresponding VAL UEs or set of VAL UEs. The NRM server processes the request and applies/enforces the resource adaptation per VAL UE. The NRM server retrieves UE IP address by using event monitoring capability for PDU session status (or PDN connectivity status) and initiates the PCC procedures for each VAL UE. Further, the NRM server provides a network resource adaptation response to the VAL server, providing information on the fulfilment of the network resource adaptation request. This will include information either per VAL UE or per set of VAL UEs, as indicated by the network resource adaptation request of the VAL server.

At step (S410), the SEAL NRM server (404) can notify the QoS update to the UAE server (403). Thus, an updated QoS assignment (or requirement) can be sent to the UAE server (403).

At step (S411), a UAS application layer can adapt the updated QoS assignment (or requirement) (411). The UAS application layer can include the UAV-C (401), the UAE server (403), and the UAV (402). Accordingly, the UAE client (e.g., the UAV and UAV-C) and the UAE server can establish communication based on the updated QoS requirements. For example, the UAE client and the UAE server can establish communication based on the updated QoS requirements. The communication can be established, for example, using a resource request at VAL service communication establishment. In an example, the VAL server (e.g., UAE server (403)) sends a request for resources to the NRM server (e.g., NRM server (404)). The NRM server evaluates the need for network resources and use of resource sharing. The NRM server sends a session progress request containing request for resources. Policy and charging control (PCC) procedures are initiated from SIP core local inbound/outbound proxy. The Session Initiation Protocol (SIP) core local inbound/outbound proxy sends an agree message to the NRM server. The NRM server sends a resource response to the VAL server. Further, the VAL service communication is established, and resources have been allocated.

In order to use the previous assigned group ID, which can be assigned at step (308) of FIG. 3, for C2 QoS provisioning, data points can be provided between UAE client and UAE server. Exemplary data points can include the elements in Table 4.

TABLE 4

Data points for C2 QoS provisioning

| Information element | Status | Description |
|---|---|---|
| UAS group ID | M | The identifier of the UAS group (one pair of UAV and UAV-C). |
| C2 Resource requirement | M | The required C2 communication resources (e.g., bandwidth, latency) |

In some embodiments, the data points can be provided at step (S407), where the UAE server (403) can periodically monitor the QoS for the UAV (402) and the UAV-C (401) using the group ID (or UAS group ID) or subgroup ID(s) associated with the UAV (402) and the UAV-C (401). The UAE server (403) can verify whether the QoS meets the C2 Resource requirement (or pre-defined QoS requirement), such as bandwidth, latency, and/or the like.

Accordingly, the UAE server (403) can provide data points back to the UAE client (e.g., the UAV and UAV-C) as a response. An exemplary data point can include the element shown in Table 5.

TABLE 5

Response data points for C2 QoS provisioning

| Information element | Status | Description |
|---|---|---|
| Result | M | The identification of successfulness of QoS provisioning per a UAS group ID. |

Figure 5:
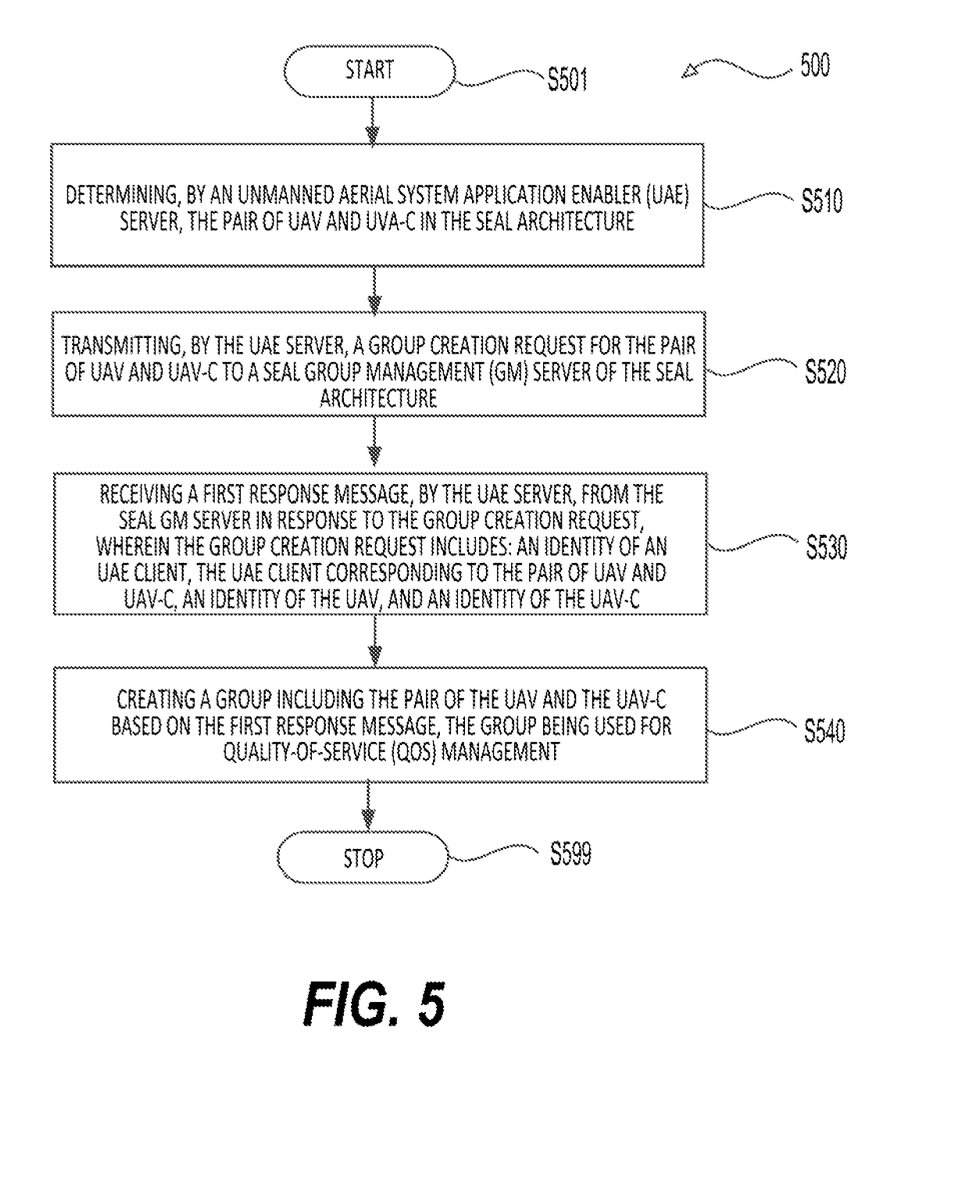
FIG. 5 shows a flow chart outlining a group creation process according to some embodiments of the disclosure.

FIG. 5 shows a process (500) of group creation for a pair of UAV and an UAV-C in a SEAL architecture. As shown in FIG. 5, the process (500) can start from (S501) and proceed to (S510). At (S510), the pair of UAV and UAV-C can be determined by a UAE server in the SEAL architecture.

At (S520), a group creation request for the pair of UAV and UAV-C can be transmitted by the UAE server to a SEAL GM server of the SEAL architecture.

At (S530), a first response message can be received by the UAE server from the SEAL GM server in response to the group creation request. The group creation request can include an identity of an UAE client that corresponds the pair of UAV and UAV-C, an identity of the UAV, and an identity of the UAV-C.

At (S540), a group including the pair of the UAV and the UAV-C can be created by the UAE server based on the first response message. The group can be used for quality-of-service (QoS) management.

In some embodiments, the group creation request can further include a CAA-level identity of the UAV.

In some embodiments, the group creation request can further include a timeout period that defines a waiting time limit to wait for the first response message from the SEAL GM server after the group creation request is transmitted to the SEAL GM server.

In the process (500), another group creation request can be transmitted when the first response message is not assigned to the UAV server within the timeout period.

In some embodiments, the first response message can further include a group creation result that indicates whether the group is successfully created for the pair of the UAV and the UAV-C.

In an embodiment, in response to the group creation result indicating that the group is successfully created for the pair of the UAV and the UAV-C, the first response message can include a group ID that is assigned to the pair of UAV and UAV-C.

In another embodiment, in response to the group creation result indicating that the group is successfully created for the pair of UAV and UAV-C, the first response message can include a plurality of subgroup IDs associated with the pair of UAV and UAV-C.

In the process (500), QoS management can be performed by the UAE server for the pair of UAV and UAV-C based on the assigned group ID.

To perform the QoS management, direct C2 communication can be established for the pair of UAV and UAV-C using an initially allocated network QoS setup, where the UAV and the UAV-C can be registered to a network. A current network condition of the pair of UAV and UAV-C can be monitored by the UAE server based on feedback information from the pair of UAV and UAV-C. In response to the direct C2 communication failing to meet a pre-defined QoS requirement, a QoS adaption request can be transmitted by the UAE server to a SEAL NRM server. An updated QoS requirement can be received by the UAE server from the SEAL NRM server. The feedback information of the pair of UAV and UAV-C can include the group ID assigned to the pair of UAV and UAV-C and a network resource requirement that indicates required C2 communication resources.

In some embodiments, the current network condition of the pair of UAV and UAV-C can be monitored by the UAE server based on the one of the group ID and a subgroup ID assigned to the pair of UAV and UAV-C.

In the process (500), the C2 communication for the pair of UAV and UAV-C can be adjusted based on the updated QoS requirement.

In some embodiments, in response to receiving the feedback information of the pair of UAV and UAV-C for the current network condition, a second response message can be provided by the UAE server to the pair of UAV and UAV-C, where the second response message can include a QoS result that indicates whether the direct C2 communication of the pair of UAV and UAV-C meet the pre-defined QoS requirement.

The techniques for Unmanned Aerial System Communication, described above, can be implemented in both a controller and a UAV as computer software using computer-readable instructions and physically stored in one or more computer-readable media, such as one or more non-transitory computer-readable storage mediums. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by processing circuitry such as computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
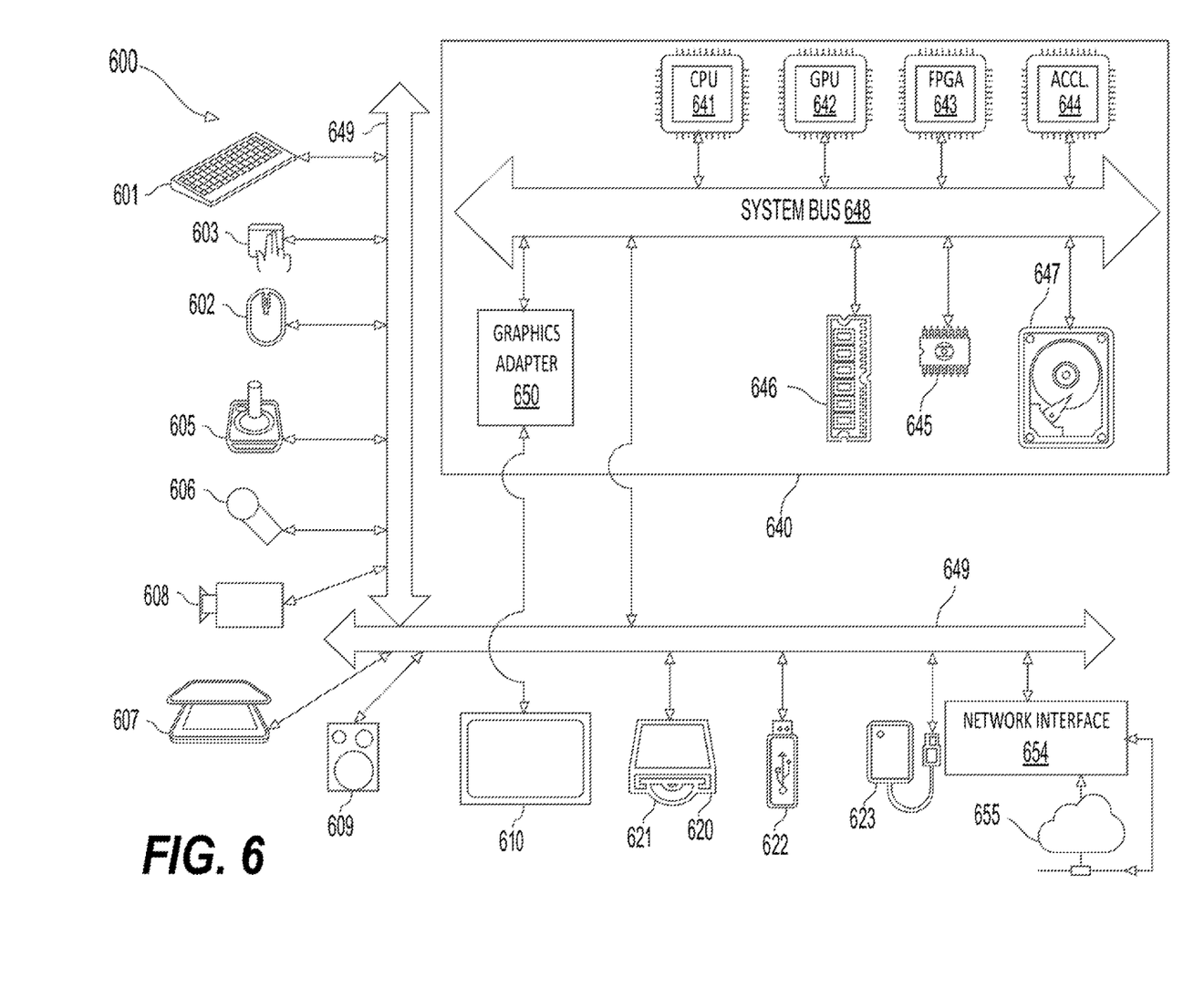
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of group creation for a pair of an unmanned aerial vehicle (UAV) and an unmanned aerial vehicle-controller (UAV-C) in a service enabler architecture layer (SEAL) architecture, the method comprising:
determining, by an unmanned aerial system application enabler (UAE) server, the pair of the UAV and the UAV-C in the SEAL architecture;

transmitting, by the UAE server, a group creation request for the pair of the UAV and the UAV-C to a SEAL group management (GM) server of the SEAL architecture;
receiving a first response message, by the UAE server, from the SEAL GM server in response to the group creation request;
creating a group including the pair of the UAV and the UAV-C based on the first response message, the group being used for quality-of-service (QOS) management;
establishing direct command and control (C2) communication for the pair of the UAV and the UAV-C using an initially allocated network QoS setup, the UAV and the UAV-C being registered to a network;
monitoring, by the UAE server, a current network condition of the pair of the UAV and the UAV-C based on feedback information from the pair of the UAV and the UAV-C;
when the direct C2 communication fails to meet a pre-defined QoS requirement, transmitting, by the UAE server, a QoS adaption request to a SEAL network resource management (NRM) server; and
receiving, by the UAE server, from the SEAL NRM server an updated QoS requirement, wherein
the feedback information of the pair of the UAV and the UAV-C includes:
a group identity (ID) assigned to the pair of the UAV and the UAV-C, and
a network resource requirement indicating required C2 communication resources.

2. The method of claim 1, wherein the group creation request further comprises a civil aviation authority (CAA)-level identity of the UAV.

3. The method of claim 1, wherein the group creation request further comprises:
a timeout period that defines a waiting time limit to wait for the first response message from the SEAL GM server after the group creation request is transmitted to the SEAL GM server.

4. The method of claim 3, the method further comprising:
transmitting another group creation request when the first response message is not assigned to the UAE server within the timeout period.

5. The method of claim 1, wherein the first response message further comprises a group creation result that indicates whether the group is successfully created for the pair of the UAV and the UAV-C.

6. The method of claim 5, wherein in response to the group creation result indicating that the group is successfully created for the pair of the UAV and the UAV-C, the first response message includes the group identity (ID) that is assigned to the pair of the UAV and the UAV-C.

7. The method of claim 6, further comprising:
performing, by the UAE server, the QoS management for the pair of the UAV and the UAV-C based on the assigned group ID.

8. The method of claim 5, wherein in response to the group creation result indicating that the group is successfully created for the pair of the UAV and the UAV-C, the first response message includes a plurality of subgroup IDs associated with the pair of the UAV and the UAV-C.

9. The method of claim 1, wherein the monitoring further comprises:
monitoring, by the UAE server, the current network condition of the pair of the UAV and the UAV-C based on the one of the group ID and a subgroup ID assigned to the pair of the UAV and the UAV-C.

10. The method of claim 1, further comprising:
adjusting the C2 communication for the pair of the UAV and the UAV-C based on the updated QoS requirement.

11. The method of claim 1, further comprising:
in response to receiving the feedback information of the pair of the UAV and the UAV-C for the current network condition, providing a second response message, by the UAE server, to the pair of the UAV and the UAV-C, the second response message including a QoS result that indicates whether the direct C2 communication of the pair of the UAV and the UAV-C meet the pre-defined QoS requirement.

12. An apparatus, comprising:
processing circuitry configured to:
determine a pair of an unmanned aerial vehicle (UAV) and an unmanned aerial vehicle-controller (UAV-C) in a service enabler architecture layer (SEAL) architecture;
transmit a group creation request for the pair of the UAV and the UAV-C to a SEAL group management (GM) server of the SEAL architecture;
receive a first response message from the SEAL GM server in response to the group creation request;
create a group including the pair of the UAV and the UAV-C based on the first response message, wherein the group is used for quality-of-service (QOS) management;
establish direct command and control (C2) communication for the pair of the UAV and the UAV-C using an initially allocated network QoS setup, the UAV and the UAV-C being registered to a network;
monitor a current network condition of the pair of the UAV and the UAV-C based on feedback information from the pair of the UAV and the UAV-C;
when the direct C2 communication fails to meet a pre-defined QoS requirement, transmit a QoS adaption request to a SEAL network resource management (NRM) server; and
receive from the SEAL NRM server an updated QoS requirement, wherein the feedback information of the pair of the UAV and the UAV-C includes:
a group identity (ID) assigned to the pair of the UAV and the UAV-C, and
a network resource requirement indicating required C2 communication resources.

13. The apparatus of claim 12, wherein the group creation request further comprises a civil aviation authority (CAA)-level identity of the UAV.

14. The apparatus of claim 12, wherein the group creation request further comprises:
a timeout period that defines a waiting time limit to wait for the first response message from the SEAL GM server after the group creation request is transmitted to the SEAL GM server.

15. The apparatus of claim 12, wherein the first response message further comprises a group creation result that indicates whether the group is successfully created for the pair of the UAV and the UAV-C.

16. The apparatus of claim 15, wherein in response to the group creation result indicating that the group is successfully created for the pair of the UAV and the UAV-C, the first response message includes the group identity (ID) that is assigned to the pair of the UAV and the UAV-C.

17. The apparatus of claim 16, wherein the processing circuitry is further configured to:
- perform, by an unmanned aerial system application enabler (UAE) server, the QoS management for the pair of the UAV and the UAV-C based on the assigned group ID.

18. The apparatus of claim 13, wherein the processing circuitry is further configured to:
- in response to receiving the feedback information of the pair of the UAV and the UAV-C for the current network condition, provide a second response message to the pair of the UAV and the UAV-C, the second response message including a QoS result that indicates whether the direct C2 communication of the pair of the UAV and the UAV-C meet the pre-defined QoS requirement.

* * * * *